US009717216B1

(12) United States Patent
Schlachta et al.

(10) Patent No.: US 9,717,216 B1
(45) Date of Patent: Aug. 1, 2017

(54) IMPLANTABLE PET-LOCATING MICROCHIP

(71) Applicants: David Schlachta, Franklinville, NJ (US); Rachel Schlachta, Franklinville, NJ (US)

(72) Inventors: David Schlachta, Franklinville, NJ (US); Rachel Schlachta, Franklinville, NJ (US)

(*) Notice: Subject to any disclaimer, the term of this patent is extended or adjusted under 35 U.S.C. 154(b) by 0 days.

(21) Appl. No.: 14/729,118

(22) Filed: Jun. 3, 2015

(51) Int. Cl.
*G08B 23/00* (2006.01)
*A01K 11/00* (2006.01)

(52) U.S. Cl.
CPC .................. *A01K 11/008* (2013.01)

(58) Field of Classification Search
CPC ...... A61B 5/065; A01K 11/008; A01K 29/00; A01K 11/006; A61N 1/05
USPC ...................................... 340/573.3
See application file for complete search history.

(56) References Cited

U.S. PATENT DOCUMENTS

| | | | |
|---|---|---|---|
| 5,850,196 A | 12/1998 | Mowers | |
| D409,803 S | 5/1999 | Yoka | |
| 6,441,778 B1 | 8/2002 | Durst | |
| 7,411,492 B2 | 8/2008 | Greenberg | |
| 7,589,638 B2 | 9/2009 | Jackson | |
| 7,864,057 B2 | 1/2011 | Milnes | |
| 2006/0082362 A1* | 4/2006 | Hino | B62K 23/04 324/207.2 |
| 2007/0139187 A1 | 6/2007 | Dobosz | |
| 2010/0238022 A1 | 9/2010 | Au | |
| 2010/0295691 A1* | 11/2010 | King, Jr. | H01R 4/22 340/635 |
| 2011/0061605 A1* | 3/2011 | Hardi | A01K 15/021 119/721 |
| 2012/0026110 A1* | 2/2012 | Yamano | G06F 3/0418 345/173 |
| 2013/0012234 A1* | 1/2013 | Tufty | H04W 4/028 455/456.3 |
| 2013/0285815 A1 | 10/2013 | Jones, II | |
| 2014/0300473 A1* | 10/2014 | Vatn | G08B 13/1427 340/540 |
| 2015/0057963 A1* | 2/2015 | Zakharov | A61B 5/01 702/131 |

* cited by examiner

*Primary Examiner* — Don N Vo

(57) ABSTRACT

The implantable pet locating microchip is a device that monitors the location of an animal, monitors the internal temperature of an animal, and monitors the gait of an animal. The location of the animal is provided by a GPS device. The internal temperature of the animal is monitored by a thermal device. The gait of the animal is monitored through the use of an angle sensor or a force sensor. This measured information is then transmitted to a receiving device such as a tablet or smart phone where it can be monitored. The implantable pet locating microchip is also configured to receive inquiries that initiates the immediate transmittal of the measured information. The implantable pet locating microchip comprises a housing, a battery, a location module, a thermal device, a gait sensor, a logic module, a transceiver, and an optional magnet.

2 Claims, 4 Drawing Sheets

IMPLANTABLE PET-LOCATING MICROCHIP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of navigation and animal care, more specifically, an animal implant configured for use in monitoring the condition and location of an animal.

SUMMARY OF INVENTION

The implantable pet locating microchip is a device that monitors the location of an animal, monitors the internal temperature of an animal, and monitors the gait of an animal. The location of the animal is provided by a GPS device. The internal temperature of the animal is monitored by a thermal device. The gait of the animal is monitored through the use of an angle sensor or a force sensor. This measured information is then transmitted to a receiving device such as a tablet or smart phone 133 where it can be monitored. The implantable pet locating microchip is also configured to receive inquiries that initiates the immediate transmittal of the measured information.

These together with additional objects, features and advantages of the implantable pet locating microchip will be readily apparent to those of ordinary skill in the art upon reading the following detailed description of the presently preferred, but nonetheless illustrative, embodiments when taken in conjunction with the accompanying drawings.

In this respect, before explaining the current embodiments of the implantable pet locating microchip in detail, it is to be understood that the implantable pet locating microchip is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the implantable pet locating microchip.

It is therefore important that the claims be regarded as including such equivalent construction insofar as they do not depart from the spirit and scope of the implantable pet locating microchip. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
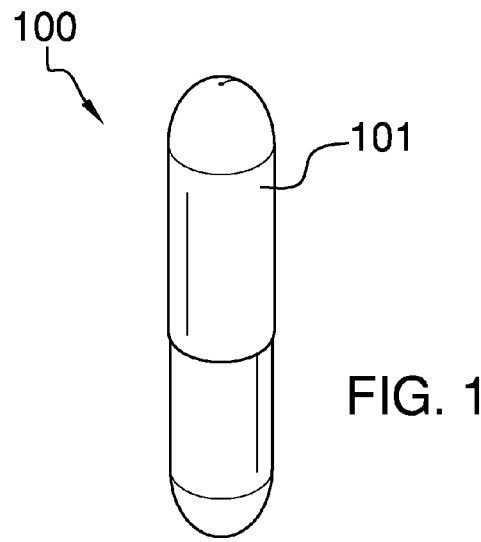
FIG. 1 is a perspective view of an embodiment of the disclosure.
Figure 2:
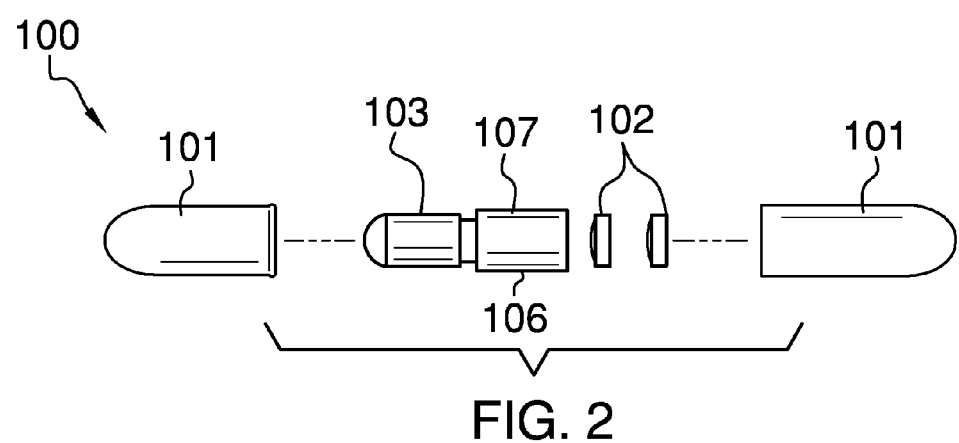
FIG. 2 is an exploded view of an embodiment of the disclosure.
Figure 3:
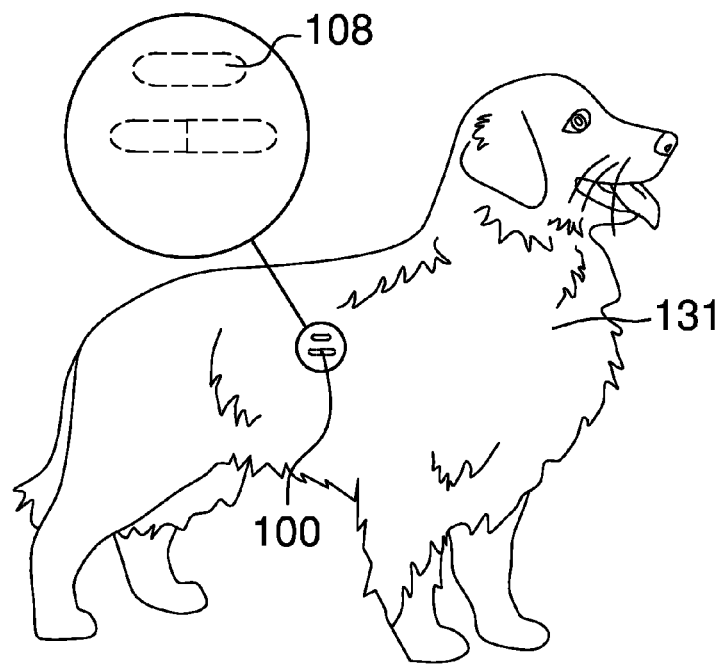
FIG. 3 is an in use view of an embodiment of the disclosure.
Figure 4:
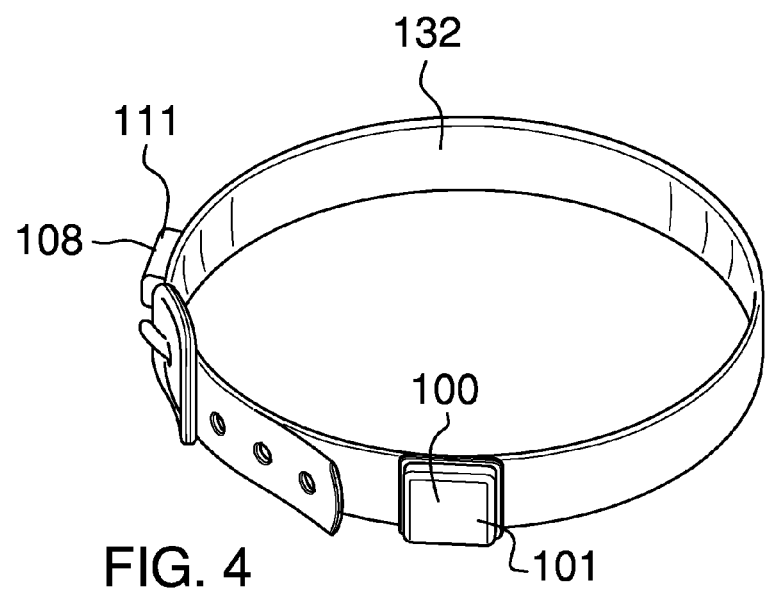
FIG. 4 is a perspective view of an alternate embodiment of the disclosure.
Figure 5:
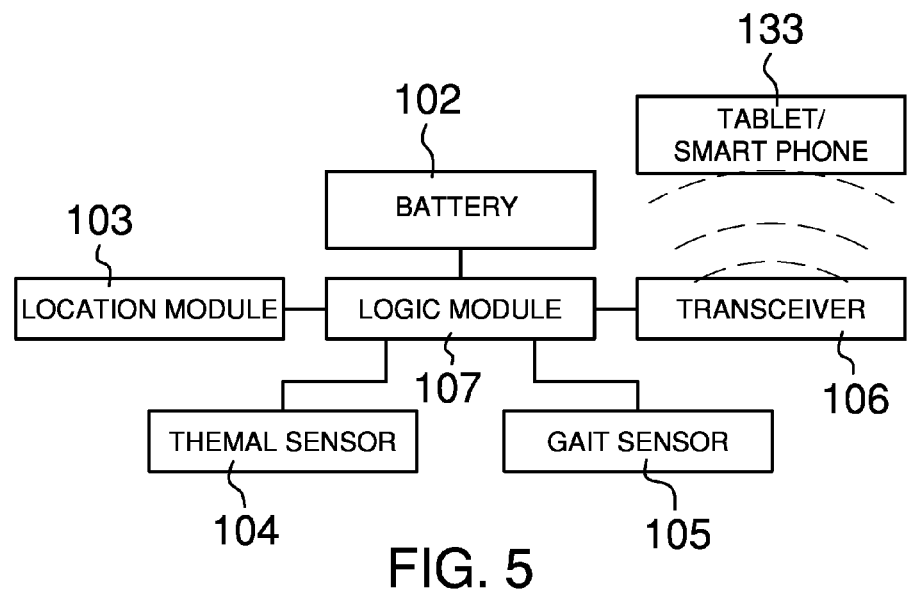
FIG. 5 is a block diagram of an embodiment of the disclosure.
Figure 6:
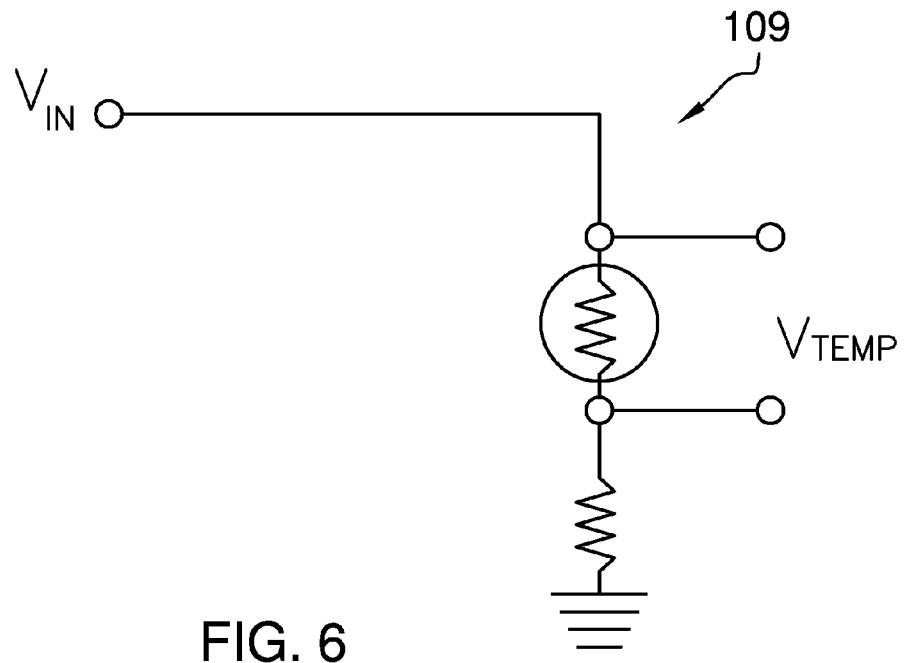
FIG. 6 is a detail view of an embodiment of the disclosure.
Figure 7:
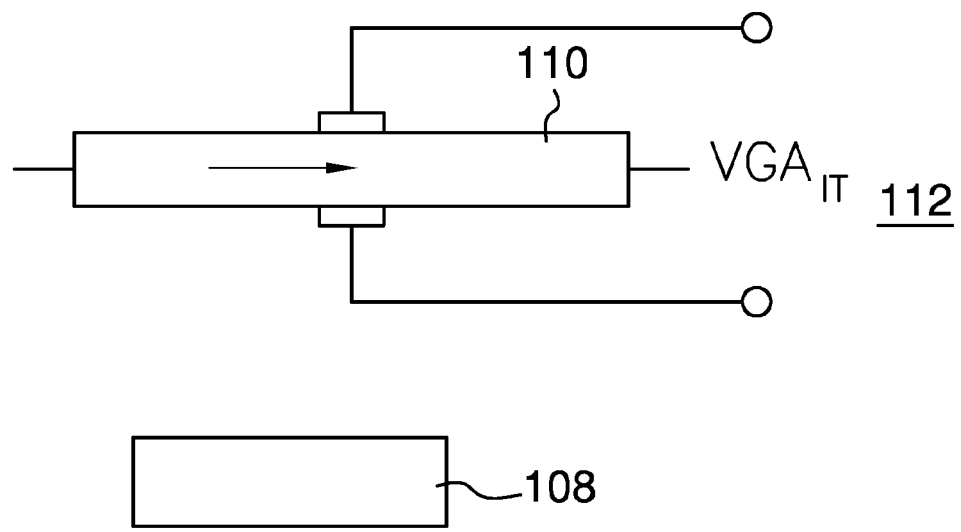
FIG. 7 is a detail view of an embodiment of the disclosure.

Detailed reference will now be made to several potential embodiment of the disclosure, which are illustrated in FIGS. 1 through 7.

The implantable pet locating microchip 100 (hereinafter invention) comprises a first housing 101, a battery 102, a location module 103, a thermal device 104, a gait sensor 105, a transceiver 106, a logic module 107 and an optional magnet 108.

The location module 103 is a tracking device that is used to determine the location of the invention 100. The location module 103 can be a GPS based device that determines the location of the invention 100 using the Global Positioning System.

The thermal device 104 is a device that is used to monitor the temperature of the pet 131. The thermal device 104 can be a thermistor or a resistance temperature detector. The resistance of either device will vary in a predictable manner in relation to the temperature of the device. By inserting the thermal device 104 into a voltage divider 109 circuit and applying a known voltage to the circuit, the temperature of the pet 131 can be determined by measuring the voltage 113 measured across the thermal device 104.

The gait sensor 105 is a device that is used to monitor the gait of the pet 131. To monitor the gait, the invention 100 is implanted into the pet 131 near the shoulder of the pet 131. From this position, the gait can be monitored using several methods. These methods include, but are not limited to, using a piezoelectric sensor or using a rotational angle sensor.

In a first potential embodiment of the disclosure, the gait sensor 105 uses a rotational angle sensor to monitor the pet's 131 gait. In this scenario, the gait sensor 105 comprises a Hall Effect sensor 110 and a magnet 108. The Hall Effect voltage 112 generated by the Hall Effect sensor 110 will be affected by the relative angle between the magnet 108 and the Hall Effect sensor 110. The magnet 108 used is a permanent bar magnet. The magnetic field generated by the bar magnet will not vary significantly with the gait of the pet 131. However, the position of the Hall Effect sensor 110 will vary with the gait of the pet 131. By measuring the change in the Hall Effect voltage 112, the gait of the pet 131 is monitored. In a first potential embodiment of the disclosure, the invention 100 is inserted into the animal along with a separate magnet 108.

In a second potential embodiment of the disclosure, the gait sensor 105 uses a piezoelectric sensor to monitor the pet's 131 gait. When force is applied to a piezoelectric sensor, a measurable static charge voltage is generated. The deformations in the piezoelectric sensor caused by the animals gait can be measured and recorded by the invention 100.

The purpose of the logic module 107 is to: 1) monitor the location of the invention 100; 2) monitor the temperature of the pet 131; 3) monitor the gait of the pet 131; 4) generate and transmit regularly scheduled messages regarding the location and well-being of the pet 131; 5) generate and transmit an alarm message should the thermal device 104 or gait sensor 105 readings meet predetermined criteria; 6) receive inbound communication initiating an ad hoc report; and, 7) generate and transmit an ad hoc report initiated by the inbound communication. Optionally, the logic module 107 can also be programmed to monitor the battery 102 and to transmit a signal when the battery 102 needs replacing. The logic module 107 is a programmable device that accepts digital and analog inputs, processes the digital and analog inputs according to previously stored instruction and to provide the results of these instructions as digital or analog outputs.

The transceiver 106 is a communication device that transmits outbound messages and receives inbound messages. The transceiver 106 routes inbound messages to the logic module 107 for processing. The logic module 107 also initiates the transceiver 106 to transmit a message and provides the contents of the message. The transceiver 106 can be a Bluetooth or 802.11 based device or can be a cellular device that transmits messages via text messaging (SMS) services.

The first housing 101 is a casing that encloses and protects the battery 102, location module 103, thermal device 104, the gait sensor 105, and the transmitter 106. The purpose of the battery 102 is to provide electrical power for use by the invention 100.

In a third potential embodiment of the invention 100, the invention 100 is not implanted but is mounted on a collar 132. In this embodiment, the first housing 101 is mounted directly on the collar 132 and, if used, a magnet 108 is mounted in a second housing 111 and placed on the collar 132. The thermal device 104 is replaced with a thermocouple that that is configured to measure the differential temperature between the pet 131 side of the collar 132 and ambient temperature. The battery 102 is configured with a USB micro port 112 to allow for programming of the logic module 107 and charging the battery 102.

To use the first potential and second potential embodiment of the invention 100, the logic module 107 and transceiver 106 are associated with the cell phone or other device that is designated to receive messages from the invention 100. This is done before surgery by sending a series of text messages with the required information. If a module needs to be programmed for a different device, this can also be done through a series of text messages. A similar functionality can be provided when other communication methods are used. The device is then implanted in the pet 131.

To use the third potential embodiment of the disclosure, the logic module 107 and transceiver 106 are associated with the cell phone or other device that is designated to receive messages from the invention 100. This can be done by uploading the information through the USB micro port 112. The collar 132 is then fitted on the pet 131.

In the first potential embodiment of the disclosure, a commercially available monolithic rotational sensor (EM3242 from DigiKey) is used. A commercially available GPS locator is used. A commercially available SMS chip is used as the transceiver. Alternatively, a combination GPS/GPRS can be used for the GPS locator and the transceiver. A microcontroller is used as the logic module 107. Batteries and housings suitable for implantation are well known and documented in the industry The following definitions and directional references were used in this disclosure:

Microcontroller: As used in this disclosure, a microcontroller is a small computer, often on a single integrated circuit, containing a processor core, memory, and programmable input/output peripherals.

Transceiver: As used in this disclosure, a transceiver is a device that is used to transmit and receive radio signals.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A pet locating device comprising:
a location module, a thermal device, a gait sensor, and a transceiver;
wherein a pet locating chip is adapted to be implantable in the pet;
wherein the location module is a sensor that determines the position of the pet;
wherein the thermal device is a sensor that measures the temperature of the pet;
wherein the gait sensor is a sensor that measures the gait of the pet;
wherein the transceiver is a communication device;
wherein the location module is a tracking device;
wherein the location module is a global positioning system based device;

wherein the thermal device is selected from a group consisting of a thermistor or a resistance temperature device;

wherein the pet locating device further comprises a logic module;

wherein the logic module monitors the location of the pet locating device;

wherein the logic module monitors the temperature of the pet;

wherein the logic module monitors the gait of the pet;

wherein the logic module generates and transmits regularly scheduled messages regarding the location and well-being of the pet;

wherein the logic module generates and transmits an alarm message should the thermal device or gait sensor readings meet predetermined criteria;

wherein the logic module receives inbound communication initiating an ad hoc report;

wherein the logic module generates and transmits an ad hoc report initiated by the inbound communication;

wherein the pet locating device further comprises a battery;

wherein the logic module monitors the battery;

wherein the logic module transmits a low battery message when the battery is low in power;

wherein the transceiver is a communication device that transmits outbound messages and receives inbound messages;

wherein the pet locating device further comprises a first housing;

wherein the first housing is implantable in the pet;

wherein the first housing contains the battery, the location module, the thermal device, the gait sensor, and the transmitter;

wherein the gait sensor comprises a piezoelectric sensor, a Hall Effect sensor and a magnet.

2. A pet locating device comprising a location module, a thermal device, a gait sensor, and a transceiver;

wherein the pet locating device is mounted on a collar wherein the location module is a sensor that determines the position of the pet;

wherein the thermal device is a sensor that measures the temperature of the pet;

wherein the gait sensor is a sensor that measures the gait of the pet;

wherein the transceiver is a communication device;

wherein the location module is a global positioning system based device;

wherein the thermal device is selected from a group consisting of a thermistor, a resistance temperature device, or a thermocouple;

wherein the gait sensor comprises a Hall Effect sensor and a magnet;

wherein the pet locating device further comprises a logic module;

wherein the logic module monitors the location of the pet locating device;

wherein the logic module monitors the temperature of the pet;

wherein the logic module monitors the gait of the pet;

wherein the logic module generates and transmits regularly scheduled messages regarding the location and well-being of the pet;

wherein the logic module generates and transmits an alarm message should the thermal device or gait sensor readings meet predetermined criteria;

wherein the logic module receives inbound communication initiating an ad hoc report;

wherein the logic module generates and transmits an ad hoc report initiated by the inbound communication.

* * * * *